3,534,965
PLAY BALLS

Stanley R. Harrison, Castle Bromwich, near Birmingham, and Robert M. Broughton, Boldmere, Sutton Coldfield, England, assignors to The Dunlop Company Limited, London County, England, a British company
No Drawing. Filed June 29, 1967, Ser. No. 649,797
Claims priority, application Great Britain, July 22, 1966, 32,953/66; Mar. 7, 1967, 10,734/67
Int. Cl. A63b 37/00; C08f 29/22
U.S. Cl. 273—218          9 Claims

ABSTRACT OF THE DISCLOSURE

Playballs, e.g. golf balls, comprising a cured composition containing rubber and a thermoplastic block copolymer A—(B—A)$_n$, where A has a glass transition temperature above 25° C. and a molecular weight from 200 to 100,000 and B has a glass transition temperature below 10° C. and a molecular weight from 25,000 to 1,000,000. The balls may be single piece mouldings or a core of one or more portions encased in a cover.

---

This invention relates to playballs and particularly to balls suitable for use as golf balls for general purposes and for practice on driving ranges.

Golf balls for use in tournaments and competitions are of a high quality with regard to durability, flight and playing characteristics, but such golf balls are expensive. For general playing purposes and for practice, such as on a driving range, it is usual to use a cheaper ball than the tournament balls, but the cheaper ball is required to have durability, flight characteristics and playing characteristics which do not differ greatly from those of a tournament ball. In particular the practice ball is required to have good resistance to cutting and good flight characteristics such that when struck with a golf club the ball will travel approximately the same distance as a tournament ball would travel. Also, the practice ball should preferably have the same feel when struck as a tournament ball and should preferably result in the same "click" when struck as is given by a tournament ball.

According to the present invention there is provided a playball including a cured composition comprising a blend of rubber and a thermoplastic block copolymer having the general formula A—(B—A)$_n$ as hereinafter defined, the rubber being present in the blend in an amount of from 10 to 90 percent by weight of the blend.

The block copolymer referred to herein has the general formula A—(B—A)$_n$ in which A represents a polymer block having a glass transition temperature greater than 25° C. and having a number average molecular weight in the range of 200 to 100,000 and B is an elastomeric polymer block having a number average molecular weight in the range 25,000 to 1,000,000 and a glass transition temperature below 10° C. and wherein $n$ is an integer from 1 to 10.

These thermoplastic block copolymers have only recently become known and have been employed as elastomeric materials. It has now been found that when heavily cross-linked by heating to an elevated temperature in the presence of a curing agent there is an unexpected and significant decrease in resiliency and a large increase in hardness and brittleness. In a blend with a rubber, it is believed that the highly cross-lined thermoplastic acts as a hard resin. The A block can be formed from styrene, alkyl styrene, alpha-olefines such as propylene, and the B block can be formed from butadiene, isoprene, and other diolefine mixtures of ethylene and propylene and other monomers capable of forming elastomeric polymer blocks.

The preferred thermoplastic block copolymer is made from butadiene and styrene.

According to the present invention there is also provided a method for the manufacture of a playball, comprising forming a composition including a blend of rubber and a thermoplastic block copolymer having the general formula A—(B—A)$_n$ as hereinbefore defined, the rubber being present in the blend in an amount of from 10 to 90 percent by weight of the blend, adding filler, if desired, and curing agent, and curing and moulding the composition obtained to form a ball.

The amount of rubber is usually from 20 to 80 percent by weight and preferably is from 30 to 70 percent by weight of the blend.

The rubber used may be natural or synthetic and examples of suitable synthetic rubbers are polybutadiene (especially cis-polybutadine), copolymers of butadiene with styrene and acrylonitrile, polybutylene, polychloroprene, polyisoprene and copolymers of ethylene with propylene or high alpha-olefines. It is to be understood that blends or mixtures of synthetic rubbers, or of natural rubber and one or more synthetic rubbers, may be used. Preferably, the rubber is cis-polybutadiene or a blend or mixture of cis-polybutadiene with natural rubber, and in this latter case the cis-polybutadiene should be present in an amount of at least 50 percent by weight of the blend or mixture. A high molecular weight cis-polybutadiene is preferred, e.g. a polymer having a molecular weight of from $2 \times 10^5$ to $2 \times 10^6$.

The blend of the thermoplastic block copolymer and the rubber can be prepared by mixing the two components together on a mill or in an internal mixer at an elevated temperature. The temperature can conveniently be from 30° C. to 50° C. higher than the melting point of the thermoplastic component. Fillers, colouring agents and antioxidants, if required, can be added to the blend during this mixing. The blend is then cooled to 115° C. to 125° C. prior to the addition of curing agents, after which the composition can be cooled and chipped or granulated.

Curing is preferably effected by the use of organic peroxide curing agents such as dicumyl peroxide, or if desired curing can be effected by irradiation and sulphur. Peroxide levels of 3 parts to 10 parts per hundred parts by weight of the blend are preferred.

Usually, the curable composition of the blend will be cured by heating it in the presence of a curing agent at an elevated temperature and suitable temperatures are from 150° C. to 250° C. The composition is also moulded to form the ball at a temperature usually from 150° C. to 250° C. and so moulding and curing are usually effected substantially simultaneously. The composition can be formed into the ball by a variety of moulding techniques e.g., injection, compression or transfer moulding. When the composition is cured by heating, the time required for curing will usually be short, say 20 to 60 minutes, depending upon the cross linking system used. In the case of organic peroxide the time will depend on the half-life of the peroxide chosen and the cure there will usually be of the order of 20 to 60 minutes.

The amount of filler material is usually from 30 to 70 percent by weight of the polymer and depends on the size and weight of the ball to be produced. Whilst most fillers can be used those with a very high specific gravity are preferred in order to reduce the required loading to a minimum.

A ball of the present invention can be a one-piece moulded ball or a composite ball consisting of two or more portions, for example the ball can comprise a core and cover, the core comprising a blend of rubber and a thermoplastic block copolymer having the general formula $A-(B-A)_n$ as hereinbefore defined, said rubber being present in the blend in an amount of from 10 to 90 percent by weight of the blend.

The cover can be of the same composition as the core or different. For example, the cover can be of one or more of the following: a blend of the type disclosed in our British patent applications Nos. 32952/66 and 3254/66; balata; trans-polymers of a conjugated diolefine, for instance trans-polyisoprene, trans-polybutadiene (preferably having a trans-polymer content of at least 90%); cis-polymers of conjugated diolefines, for instance cis-polyisoprene, cis-polybutadiene, preferably having a cis-polymer content of at least 50%; natural rubber; polyurethanes; polyamides; copolymers of butadiene and styrene; polymers and copolymers of ethylene; polymers and copolymers of propylene; compositions of our British patent applications Nos. 5693/65 and 38674/65; copolymers of unsaturated olefines with esters of unsaturated acids, for instance methyl methacrylate-butadiene copolymers, especially those of high (especially predominating) methyl methacrylate content or neoprene, especially in crystalline form.

The cover can be one or more of the elastomeric materials disclosed in British specification No. 1,037,091.

The cover composition can contain a filler, for example inorganic fillers such as silica, lead carbonate or titanium dioxide, the latter being especially useful in providing a white appearance to the ball.

The term "copolymer" used in this specification includes polymers obtained from two, three or more reactants (which can be monomers or partially polymerized materials), interpolymers, block polymers and blends thereof.

The method by which the cover is fixed to the core depends upon the nature of the material used for the cover. Where it is a thermoplastic material it can be applied either by an injection moulding process, for instance one in which molten material is forced around the periphery of the core centrally mounted in a spherical mould, or it can be applied for instance in the form of two hemi-spherical shells encasing the core and which are moulded to the core and are sealed together along their edges to form a smooth integral spherical shell cover. The latter process can also be used where the material used for the cover is not thermoplastic.

The means by which the cover is fixed to the core depends very much upon the nature of material of the cover and core. Where the cover is formed by a process of injection moulding around the core there is normally no need for auxiliary means of fixing as the material of the cover will, while still molten, flow into intimate contact with the periphery of the core resulting in a strong bond between the two portions of the ball. However, where the cover is moulded, for example by compression moulding, from two hemi-spherical shells it may be necessary to use auxiliary means of fixing, for example an adhesive. An alternative auxiliary means of fixing is by mechanical interlocking means, for example by forming the core so as to have protuberances or recesses in its surface onto which the cover can lock when moulded onto the core.

A further form of golf ball according to the present invention is one in which the core itself consists of two or more portions. Such a structure is very useful where it is wished to concentrate the weight of the ball on the centre, though it can be used in other circumstances. In such a structure the core can consist of a spherical inner portion or inner core (for instance a glass or steel ball) surrounded by two or more outer core portions which together form a spherical shell about it. For example, if there are two outer core portions they can be in the form of hollow hemi-spherical shells which together surround the inner core to form a composite structure of spherical shape. The material composing the inner core and outer core portions can be the same or different, and one or more of the inner core or outer core portions can comprise the blend of rubber and a thermoplastic block copolymer having the general formula $A-(B-A)_n$, as hereinbefore defined.

The dimensions of the components of a composite golf ball according to the present invention may suitably be as follows:

| Ball diameter, inches | 1.62 | 1.68 |
|---|---|---|
| Two component ball: | | |
| Core diameter, inches | 0.75–1.6 | 0.75–1.64 |
| Preferred range, inches | 1.00–1.54 | 1.00–1.60 |
| Cover thickness, inches | 0.020–0.435 | 0.020–0.465 |
| Preferred range, inches | 0.040–0.310 | 0.040–0.340 |
| Particularly preferred range, inches | 0.060–0.125 | 0.060–0.125 |
| Three component ball: | | |
| Inner core diameter, inches | 0.25–1.00 | 0.25–1.00 |
| Overall core diameter, inches | 0.75–1.60 | 0.75–1.64 |
| Cover thickness | As for two component bal | |

The present invention provides a ball which can be produced more economically than conventional golf balls. Golf balls for use in tournaments and competitions usually consist essentially of a core comprising a core centre of paste contained in a spherical rubber sac wound with rubber thread and/or rubber tape, and a cover compound of balata or the like round the core. Such balls have excellent durability, flight and playing characteristics but they are expensive to produce due to the lengthy procedure of manufacture. A cheaper ball is required for general playing purposes and for practice (e.g. on practice driving ranges) and hitherto such balls, in commercial use, have usually had essentially the same construction as the tournament ball but having a solid rubber centre and having a cover made of a cheaper material (e.g. polychloroprene) than the tournament ball. These practice balls are durable but they are nevertheless still relatively expensive to produce.

The present invention provides a ball moulded from a polymer composition without a thread-wound core, which has good flight characteristics.

The balls of the present invention, especially where they are one-piece moulded balls of uniform density throughout, can with advantage have a surface pattern according to our British patent application No. 13,924/67.

The invention is illustrated by the following examples in which Example I describes the manufacture and testing of a one-piece golf ball and Example II describes the manufacture and testing of a two component golf ball.

EXAMPLE I 55 parts of a block copolymer of styrene and butadiene (containing 27% by weight of styrene of which 2–5% could be extracted as homopolymer and having an intrinsic viscosity of 1 in benzene at 32° C.) were mixed with 45 parts of cis-polybutadiene (cis content 97 percent, ML–4 at 100° C. of 50) on a two roll mill at a temperature of 100° C. until a homogeneous blend resulted.

40 parts of lead carbonate and 3 parts of titanium dioxide were then added followed by 3.25 parts of dicumyl peroxide.

The blend was then sheeted on a mill and the composition rapidly cooled to room temperature. The resulting sheet had a thickness of 0.120 inch.

Slabs 3 inches by 1 inch were cut from the sheet and were compression moulded and cured for 45 minutes in the mould at a temperature of 160° C. The cutting resistance of the cured slab was measured and compared with a conventional golf ball cover compound. Cutting resistance is given in arbitrary figures, a higher figure indicating a better resistance. The results are given in Table I below.

A ball "A" (diameter 1.6 inch) was then moulded from the composition and cured, and its resistance to cutting in play and its flight characteristics were determined and are shown in Table I below.

EXAMPLE II

The composition of Example I was used, sheeted on a mill and extruded in a cold extruder to produce a rod 1.125 inches diameter. Spherical cores 1.04 inches diameter were moulded from plugs of the extrudate and cured for 7½ minutes at 150° C.

A cover composition was prepared as follows:

47.5 parts of a copolymer of ethylene and methacrylic acid, containing 7 percent of the acid in which 85 percent of the acid was present as the sodium salt and having a melt flow index at 190° C. of 0.5 gram/10 minutes were mixed with 52.5 parts of the cis-polybutadiene described in Example I, in an internal mixer at 150–170° C. until a homogeneous blend resulted. 42 parts of lead carbonate, 3.75 parts of titanium dioxide and 0.25 part of a pigment (for identification) were added and the mixing continued until a homogeneous blend again resulted. The mix was cooled, chipped in a granulator and 3.5 parts of dicumyl peroxide were added by tumble mixing. The blend was then compression moulded into rough sheet at 100–120° C. and rapidly cooled to room temperature. The resulting sheet had a nominal thickness of 0.125 inch.

Slabs 3 inches by 1 inch were cut from the sheet and were compressed moulded to 0.120 inch thickness and cured for 45 minutes in the mould at a temperature of 160° C. The cutting resistance of the cured slab was measured and compared with a convetional golf ball cover compound.

Golf ball hemi-spherical half-shells having an internal diameter of 1.0 inch and wall thickness 0.310 inch were moulded from the above cover composition by heating at 100–110° C. in a mould followed by cooling prior to extraction. The cores already prepared were coated with a 20% solution of triphenyl methane triisocyanate in methylene chloride and the solvent allowed to evaporate. Two half-shells were placed around a treated core and moulded in a dimpled mould at 160° C. for 45 minutes, followed by cooling prior to extraction, to produce a golf ball "B" 1.62 inches diameter of weight 45.2 grammes. The results of measurements made on the ball and slab are shown in Table I below.

For the purposes of comparison a conventional thread-wound range ball "C" of diameter 1.62 inches was subjected to the same series of tests are the balls and slabs made by the following the procedure of Examples I and II.

In Table I the headings to the various columns have the following meaning:

CR (b)=cutting resistance of the ball.
CR (s)=cutting resistance of a slab of the composition.
H=Hardness (Shore C).
Rebound=percent rebound from a height of 100 inches on to a solid concrete base.
Resilence=coefficient of restitution determined by firing a projectile at the ball and noting the time taken for ball and protectile to travel a predetermined distance.
CH=compression hardness.

"Click" is the sound made by contact between the golf club and the ball.

"Carry" represents the distance travelled by the ball from where it is struck to where it first lands on the ground.

"Total Distance" represents the total distance travelled by the ball from where it struck to where it finally comes to rest on the ground, and "Trajectory" is an arbitrary scale for comparing the heights to which balls rise during flight, a higher figure indicating a higher flight path.

The data are as follows:

TABLE I

| | CR (b) | CR (s) | H | Rebound | Resilience |
|---|---|---|---|---|---|
| A | Fairly good | 330 | 70 | 66 | 0.549 |
| B | Very good | 340 | 74 | 67 | 0.601 |
| C | Good | 320 | 70 | 60 | 0.550 |

| | CH | Click | Carry (yds.) | Total distance (yds.) | Trajectory |
|---|---|---|---|---|---|
| A | 97 | Good | 188 | 252 | 22 |
| B | 65 | ---do--- | 200 | 252 | 22½ |
| C | 100 | ---do--- | 188 | 256 | 21½ |

It will be seen from the above that the balls produced by the invention have similar properties in some respects to conventional range balls and in some respects are superior.

Having now described our invention, what we claim is:

1. A substantially spherical moulded solid golf ball formed from a composition cured sufficiently to provide a cured composition of the hardness, toughness and click requisite to a golf ball comprising a blend of (1) a rubber selected from the group consisting of polybutadiene, copolymers of butadiene with acrylonitrile, copolymers of butadiene with styrene, elastomeric copolymers of ethylene with propylene, elastomeric copolymers of ethylene with an alpha-olefin higher than propylene, polyisoprene and polychloroprene; said rubber being present in the blend in an amount of from 10 to 80% by weight of the blend and (2) a thermoplastic block copolymer having the formula A—(B—A)$_n$ selected from the group consisting of styrene-butadiene-styrene, styrene-isoprene-styrene, alkyl styrene-butadiene-alkyl styrene, alkyl styrene-isoprene-alkyl styrene, ethylene-copolymer of two alpha-mono-olefins-ethylene, and propylene-copolymer of two alpha-mono-olefins-propylene wherein A is a polymer block having a glass transition temperature greater than 25° C. and have a number average molecular weight in the range 200 to 100,000, and B is an elastomeric polymer block having a glass transition temperature below 10° C. and having a number average molecular weight in the range 25,000 to 1,000,000, and wherein $n$ is an integer of from 1 to 10.

2. A golf ball according to claim 1 wherein said composition is cured with dicumyl peroxide at a temperature of from 150 to 250° C.

3. A golf ball according to claim 1, which is a one-piece moulded ball.

4. A golf ball according to claim 1, which consists of a core encased in a cover, the core consisting essentially of the blend of claim 1.

5. A golf ball according to claim 4, in which the core consists of a spherical inner core surrounded by a spherical shell, at least one of which consists essentially of the blend of claim 1.

6. A golf ball according to claim 1, in which the rubber is present in an amount of from 30% to 70% by weight of the blend.

7. A golf ball according to claim 1, in which the rubber is a polybutadiene.

8. A golf ball according to claim 7, in which the rubber is a blend of cis-polybutadiene with natural rubber and/or one or more synthetic rubbers.

9. A golf ball according to claim 8, in which the cis-polybutadiene is present in an amount equal to at least 50% by weight of the blend.

References Cited

UNITED STATES PATENTS

| | | | |
|---|---|---|---|
| 2,914,328 | 11/1959 | Harkins | 273—230 |
| 3,119,622 | 1/1964 | Weigert | 260—5 |
| 3,265,765 | 8/1966 | Holden et al. | 260—876 |
| 3,313,545 | 4/1967 | Bartsch | 273—218 |
| 3,417,044 | 12/1968 | Ross et al. | 260—33.6 |

FOREIGN PATENTS

| | | |
|---|---|---|
| 1,026,254 | 4/1966 | Great Britain. |
| 1,427,093 | 12/1965 | France. |

MURRAY TILLMAN, Primary Examiner

M. J. TULLY, Assistant Examiner

U.S. Cl. X.R.

204—159.18; 260—4, 5, 41.5, 876, 878, 880; 273—228, 230, 235